United States Patent [19]
Rasky et al.

[11] Patent Number: 5,428,647
[45] Date of Patent: Jun. 27, 1995

[54] METHOD AND APPARATUS FOR SYNCHRONIZING A RECEIVED SIGNAL IN A DIGITAL RADIO COMMUNICATION SYSTEM

[75] Inventors: Phillip D. Rasky; James F. Kepler, both of Buffalo Grove; Gregory M. Chiasson, Barrington, all of Ill.

[73] Assignee: Motorola, Inc., Schaumburg, Ill.

[21] Appl. No.: 988,572

[22] Filed: Dec. 7, 1992

[51] Int. Cl.⁶ .............................................. H04L 7/00
[52] U.S. Cl. .................................. 375/366; 370/100.1; 370/105.4; 325/343; 325/362; 325/232
[58] Field of Search ...................... 375/12, 14, 96, 106, 375/111, 114; 370/100.1, 105.4, 105.5, 106, 108

[56] References Cited

U.S. PATENT DOCUMENTS

| | | | |
|---|---|---|---|
| 4,291,409 | 9/1981 | Weinberg et al. | 375/100 X |
| 5,212,689 | 5/1993 | Eriksson | 370/106 |
| 5,245,611 | 9/1993 | Ling et al. | 370/100.1 |

OTHER PUBLICATIONS

Borth et al. "Signal Processing Aspects of Motorola's Pan-Europeans Digital Cellular Validation Mobile" Tenth Annual Int. Phoneix Conf. on Computers and Communication, 27–30 Mar. 1991, pp. 416–23.

D'Avia et al., "Results on Fast-Kalman and Viterbi Adaptive Equalizers for Mobile Radio with CEPT/GSM System Characteristics", IEEE, 1988 pp. 0815–0819.

Parsons, Jr., Raymond D., "Polar Quantizing for Coded PSK Transmission", IEEE Transactions on Communication, vol. 38, No. 9, Sep. 1990, pp. 1511–1519.

Ariyavisitakul, Sirikiat, "Equalization of a Hard-Limited Slowly-Fading Multipath Signal Using a Phase Equalizer with Time-Reversal Structure", IEEE Journal on Selected Areas in Communications, vol. 10, No. 3, Apr. 1992, pp. 589–598.

Bellcore, Generic Criteria for Version 0.1 Wireless Access Communications Systems (WACS), Technical Advisory, TA-NWT-001313, Issue 1, Jul. 1992.

"Physical Layer on the Radio Path: General Description", GSM 05.01/Draft 3.1.0, Feb. 15, 1988.

Simon, Marvin K. Omura, Jim K., Scholtz, Robert A. Levitt, Barry K., "Spread Spectrum Communications", vol. III, pp. 66–75.

Mouly, Michel and Pautet, Marie-Bernadette, "The GSM System for Mobile Communications," pp. 214–215.

Primary Examiner—Stephen Chin
Assistant Examiner—Bryan Webster
Attorney, Agent, or Firm—Shawn B. Dempster; Kevin A. Buford

[57] ABSTRACT

A method and apparatus is provided for synchronizing a received communication signal. A synchronization signal is derived from a received signal having a plurality of synchronization words. Each synchronization word has a predetermined number of synchronization symbols. The synchronization signal is filtered. The filtering is characterized by spacing each filter tap to correspond to synchronization word length increments. Synchronization information is generated which is based on a comparison of the filtered synchronization signal to a threshold. Finally, the synchronization information is output based on a confidence derision derived from the synchronization information.

19 Claims, 4 Drawing Sheets

METHOD AND APPARATUS FOR SYNCHRONIZING A RECEIVED SIGNAL IN A DIGITAL RADIO COMMUNICATION SYSTEM

FIELD OF THE INVENTION

The present invention relates to radio communication systems and, more particularly, to a method and apparatus for synchronizing a received signal in a digital radio communication system.

BACKGROUND OF THE INVENTION

Cellular radio communication systems typically include a number of central communication base sites. Each central communication site has a service area coverage for servicing mobile communication units within the service area. The service areas typically are arranged such that adjacent remote base site service coverage areas overlap in a manner that provides a substantially continuous service region. The substantially continuous service region provides uninterrupted service by handing off mobile communication units from one base site serving a service area to an adjacent base site serving another service area.

Pedestrian as well as mobile users will typically access the same cellular radio communication systems. For purposes of this discussion, a pedestrian user is one who walks or roams slowly (traveling at 10 kilometers per hour (kph) or less) as opposed to a mobile user who rides in a vehicle (traveling up to 100 kph or more). However, these cellular communication systems are typically designed to provide adequate performance for the worst case environment (i.e., the mobile user). As such, the cellular radio communication systems typically provide continual overhead measurements used by the system to maintain channel quality or perform hand-off functions. Since these measurements require the same amount of processing whether a user is a mobile user or a pedestrian user, the pedestrian user is charged at the same air-time rate for using their cellular phone as the user who is a mobile user.

Therefore, there exists a need in the industry for a personal communication system (PCS) which would provide a low tier system for pedestrian users at a reduced cost. The low tier system would provide access via radio frequency (RF) link to a basic cellular network which may or may not provide hand-off capability between low tier service areas. In addition, a high tier system should be provided for the mobile user. This high tier system, unlike the low tier system, would have many of the features found in current cellular systems including hand-off between high tier service areas and high quality error protection.

Both the high tier and the low tier systems share some basic design constraints. One such constraint is that both systems require initial synchronization of signals between a central communication base site and a mobile communication unit which are communicating, via a radio communication link, with each other. This initial synchronization is particularly important in the high tier system, because this system must be designed to handle synchronization even though the mobile communication unit may be traveling at 100 kph. Synchronization of the two communication devices is necessary to allow the originally transmitted signal to be quickly and easily recovered from a received signal.

In communication systems, with respect to synchronization, two general areas of uncertainty of the signal exist which must be resolved before a received signal can be recovered. These areas of uncertainty are phase and frequency of the carder. In addition, the clock rate can be a source of synchronization uncertainty. Most of this uncertainty may be eliminated by utilizing accurate frequency sources in both communication devices which are communicating with each other. However, some uncertainty can not be eliminated by the use of accurate frequency sources. Doppler-related frequency errors typically can not be predicted and will affect the carder frequency. The amount of Doppler-related frequency uncertainty present in a received signal is a function of the relative velocity of the receiver which received the signal with respect to the transmitter which transmitted the signal as well as the frequency (or frequency range) at which the signal was transmitted. Further, if a mobile communication unit is in motion, then a relative phase change will occur with each change in relative position of the mobile communication unit with respect to the central communication base site in the communication link. Furthermore, a fixed-position or slow moving mobile communication unit can experience variations in phase and carder frequency due to signal propagation-path-length changes in the communication channel.

Therefore, a need exists for a synchronization technique which is simple enough to be inexpensively built for use by low tier communication unit while at the same time providing rapid synchronization for use by a communication unit operating in the high tier communication system. The high tier communication system needs rapid synchronization, because the high tier communication system may utilize a spread spectrum communication process such as frequency hopping cede division multiple access (FH-CDMA) to communicate between a mobile communication unit and a central communication base site. In FH-CDMA systems, a receiving mobile communication unit, for example, may not know the hopping pattern used by the transmitting central communication base site prior to the start of transmission. Thus, the mobile communication unit must be able to synchronize within the time period of one frequency hop so that the mobile communication unit can determine the frequency of the next hop. In addition, it is desirable to design the synchronizing technique to minimize it's vulnerability to false correlation due to the presence of noise and/or interference in the communication channel.

SUMMARY OF THE INVENTION

A method and apparatus are provided for synchronizing a received communication signal. A synchronization signal is derived from a received signal having a plurality of synchronization words. Each synchronization word has a predetermined number of synchronization symbols. The synchronization signal is filtered. The filtering is characterized by sparing each filter tap to correspond to synchronization word length increments. Synchronization information is generated which is based on a comparison of the filtered synchronization signal to a threshold. Finally, the synchronization information is output based on a confidence decision derived from the synchronization information.

DETAILED DESCRIPTION

Figure 1:
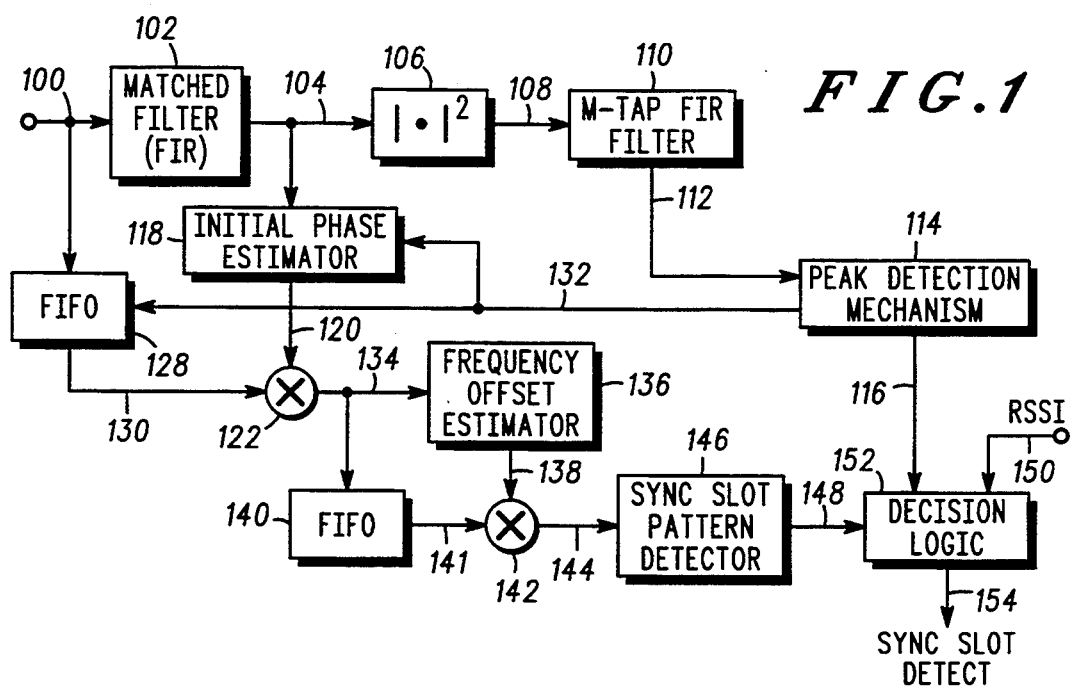
FIG. 1 is a diagram showing the preferred embodiment synchronization information generator in accordance with the present invention.

Referring now to FIG. 1, a preferred embodiment synchronization information generator in accordance with the present invention is shown. The synchronization information generator initially synchronizes a receiver to an input data sequence by determining several types of synchronization information. When the receiver is unsynchronized (e.g., on power up of the receiver), the preferred embodiment synchronization information generator is used to synchronize the receiver. The preferred embodiment synchronization information generator is optimized for use in a time division multiple access (TDMA) communication system which may or may not frequency hop. If the TDMA communication system frequency hops, then it is typically referred to as a FH-CDMA communication system. The synchronization information required for such a hopping or non-hopping TDMA communication system includes: the phase and frequency of the input data sequence as well as the relative locations of symbols, slots, frames, and superframes within the input data sequence.

Phase synchronization information may be generated by frequency translating the input data sequence constellation so that the effect of any Doppler frequency shift is eliminated. For the preferred embodiment generator, the Doppler frequency shift is assumed to be constant throughout a single time slot (or a single hop when the system frequency hops). Frequency synchronization information may be obtained by estimating the frequency offset between the input data sequence carder and a local oscillator used by the preferred embodiment generator. The frequency offset estimate may then be used to frequency translate the input data sequence constellation to eliminate the effect of the frequency offset. Symbol synchronization information can be determined by locating the input data sequence symbol boundaries. After locating the symbol boundaries, the preferred embodiment synchronization information generator or an associated receiver apparatus preferably decimates an oversampled input data sequence down to a rate of one sample per symbol. Slot and frame synchronization information, like symbol synchronization information, may be generated by determining the respective slot and frame boundaries within the input data sequence. Superframe synchronization information may be generated by determining the preferred embodiments communication system channelization scheme (including the hopping pattern when the system frequency hops).

It will be appreciated by those skilled in the art that the principles discuss herein with respect to a TDMA communication system may be readily applied to other types of communication systems such as direct sequence code division communication systems and the like.

Figure 7:
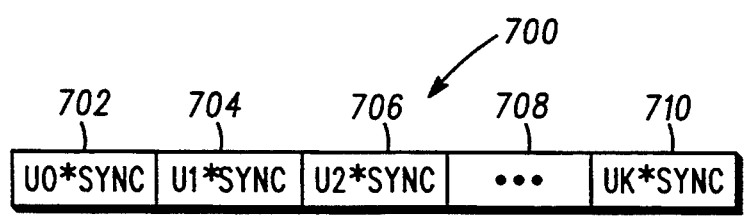
FIG. 7 shows a diagram of a preferred embodiment synchronization sequence for use in accordance with the present invention.

Complex oversampled data sequence 100 (i.e., oversampled data which may have real and imaginary components) is input to a first-in-first-out (FIFO) buffer 120 for storage during the synchronization process. In addition the complex oversampled data sequence 100 is input to a complex matched filter 102. The matched filter 102 preferably is a finite impulse response filter (FIR) which is matched to a known predetermined synchronization word. The known predetermined synchronization word preferably is a part of a known predetermined synchronization sequence 700 which consists of a plurality of synchronization words 702, 704, 706, 708, and 710, as shown shown in FIG. 7. Each synchronization word preferably includes one or more symbols. The synchronization words 702, 704, 706, 708, and 710 preferably include the same number of symbols and are ordered in the same symbol pattern. However, some of the 10 synchronization words 702, 704, 706, 708, and 710 may be inverted so that the predetermined synchronization sequence may be differentially encoded (e.g., an encoding pattern $u_0, u_1, u_2, \ldots, u_k$ may be multiplied with the synchronization words as in 702, 704, 706, 708, and 710, respectively to generate an encoded pattern synchronization sequence 708). It will be appreciated by those skilled in the art that other encoding techniques, besides differential encoding, may be employed without departing from the scope and spirit of the present invention. In addition, it will be appreciated by those skilled in the art that the synchronization words may also differ in the number of symbols, so long as the synchronization words are known, without departing from the scope and spirit of the present invention. This synchronization sequence preferably is transmitted over a communication channel periodically on a predetermined frequency such that the receiver associated with the synchronization information generator may locate the transmitted synchronization sequence during a synchronization process. The synchronization sequence may be transmitted along with an associated control channel sequence. The control channel sequence may be transmitted in the same slot as the synchronization sequence. Alteratively, the control channel sequence may be transmitted in a subsequent sequence. The control channel sequence preferably includes the superframe synchronization information. Once the other synchronization information is retrieved from the synchronization sequence, the control channel sequence may be reliably detected and the superframe synchronization information retrieved.

The matched filter's 102 output 104 is input to a magnitude squared function device 106 which converts the input complex oversampled data sequence 104 to a magnitude sequence 108 (also known as a magnitude correlation signal) which is a function of the magnitude of the input complex oversampled data sequence 104. The magnitude sequence 108 is input to an M-tap FIR filter 110 which is matched to the known predetermined synchronization sequence. The M-tap FIR filter 110 output 112 is input to a peak detection mechanism 114. Peak detection mechanism 114 determines if the known predetermined synchronization sequence is present in the output 112 of the M-tap FIR filter 110. If the synchronization sequence is detected, then decision logic 152 is notified of the detection through an output signal 116 by peak detection mechanism 114.

In addition, the peak detection mechanism 114 sends a peak filter output 132 of the M-tap FIR filter output 112 to the FIFO buffer 128 so that the peak filter output 132 can be saved along with the input data sequence 100 at the location of where the peak filter output 132 occurred in the input data sequence 100. This location provides the exact position of the synchronization sequence within the input data sequence 100. By knowing this position, the input data sequence 100 frame, slot, and bit synchronization information can be generated. In addition, a decimator (not shown) may be adjusted as a function of the peak filter output 132 to properly decimate the input data sequence 100 which is stored in FIFO buffer 128 into one sample per symbol in the input data sequence 100.

The peak filter output 132 is also input to an initial phase estimator 118. The initial phase estimator 118 computes a complex phase correction value 120 from input matched filter output 104 and the peak filter output 132. The complex phase correction value 120 corresponds to the amount of phase offset in the input data sequence 100 relative to the local oscillator used by the preferred embodiment. The complex phase correction value 120 is coupled to one input of combiner 122. The input data sequence 130 which was stored in FIFO buffer 128 (in either decimated or non decimated form) is provided to the other input of combiner 122. Combiner 122 preferably generates a phase-corrected input data sequence 134 by multiplying the input data sequence 130 with the complex phase correction value 120. The phase-corrected input data sequence 134 is then preferably stored in a FIFO buffer 140.

The phase-corrected input data sequence 134 is also input to a frequency offset estimator 136. The frequency offset estimator 136 computes a complex frequency correction value 138. The complex frequency correction value 138 corresponds to the amount of frequency offset in the input data sequence 100 relative to the local oscillator used by the preferred embodiment synchronization information generator. The complex frequency correction value 138 may be determined in one of several known methods. For example, in the preferred embodiment, part of the phase-corrected input data sequence 134 is known (i.e., the predetermined synchronization sequence is known ). Thus, using the known predetermined synchronization sequence, the slope of the phase trajectory can be determined. This phase trajectory slope can subsequently be mapped to the frequency domain as the frequency offset to generate the complex frequency correction value 138.

Alternatively, the complex frequency correction value 138 may be determined in the following manner. In the preferred embodiment, the phase-corrected input data sequence 134 includes a synchronization sequence preferably consisting of a plurality of synchronization words. The use of a plurality of synchronization words can be exploited in determining a frequency offset by forming a set of complex values that contain peak values caused by the synchronization words in the matched filter 102 (e.g., if five synchronization words are used, then the set has five complex values). For this frequency offset calculation method to work, the matched filter 102 output 104 must be input to the frequency offset estimator 136. Subsequently, any differential encoding pattern is preferably removed from the set. In addition, the slope of the phase trajectory is determined. This slope is then mapped to the frequency domain as the frequency offset to generate the complex frequency correction value 138. This frequency offset calculation method has an advantage over the previous method that the samples used in the calculation have a higher signal to noise ratio, since the samples come from the matched filter 102 output 104. However, because the samples are spaced farther apart in time, this frequency offset estimation method can not handle as large of a frequency offset as the previously described one.

The complex frequency correction value 138 is coupled to one input of combiner 142. The phase-corrected input data sequence 141 which was stored in FIFO buffer 140 is provided to the other input of combiner 142. Combiner 142 preferably generates a frequency-corrected input data sequence 144 by multiplying the input data sequence 141 with the complex phase correction value 138.

Optionally, if the known predetermined synchronization sequence preferably consists of differentially encoded synchronization words, a differentially encoded pattern detector 146 may be coupled to the output 144 of combiner 142 (i.e., the frequency-corrected input data sequence 144). The differentially encoded pattern detector 146 sends a message, via a signal 148, to the decision logic 152 when the differentially encoded synchronization pattern is detected. Otherwise, if the known predetermined synchronization sequence does not consist of differentially encoded synchronization words, the frequency-corrected input data sequence 144 may be directly coupled via signal 148 to the decision logic 152.

In addition, a received signal strength indicator (RSSI) signal optionally may be input to decision logic 152. The RSSI signal is used by the decision logic 152 to minimize falsing problems when no input data sequence 100 is present. Decision logic 152 analyzes all of the input decision factors 116, 148, and 150 to derive a confidence derision 154 of whether or not the known predetermined synchronization sequence was detected in the input data sequence 100. This confidence decision 154 as well as any other information (e.g., phase and frequency offset information) may then be output from the synchronization information generator by the decision logic 152.

Figure 2:
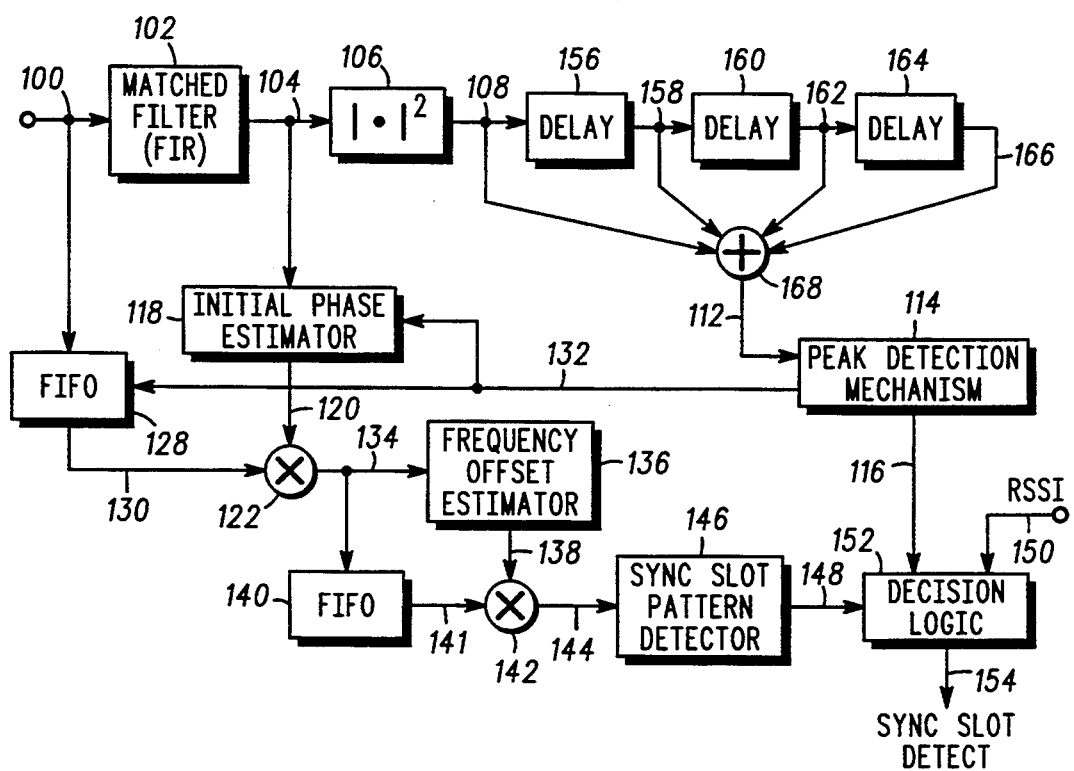
FIG. 2 is a diagram showing a first alternative preferred embodiment synchronization information generator in accordance with the present invention.

Referring now to FIG. 2, an alternative preferred embodiment synchronization information generator is shown. The alterative preferred embodiment synchronization information generator is configured and operated substantially as described in reference to the preferred embodiment synchronization information generator shown in FIG. 1. In this alternative embodiment, the M-tap FIR filter 110 has been replaced by elements 156, 160, 164 and 168 which input and output substantially the same information as previously described in reference to the M-tap FIR filter 110. For this alternative preferred embodiment, the known predetermined synchronization sequence preferably consists of four synchronization words. The synchronization words preferably am of equal length and are ordered in the same symbol pattern. The magnitude correlation signal 108 is input to a summing device 168. The magnitude correlation signal 108 is also input to delay mechanism 156 which delays the magnitude sequence by the length of one synchronization word. The one synchronization word delayed magnitude correlation signal 158 is input to summing device 168. The one synchronization word delayed magnitude correlation signal 158 is also input to delay mechanism 160 which delays the magnitude correlation signal 158 by the length of another synchronization word. The two synchronization word delayed magnitude correlation signal 162 is input to summing device 168. The two synchronization word delayed magnitude correlation signal 162 is also input to delay mechanism 164 which delays the magnitude correlation signal 162 by the length of another synchronization word. The three synchronization word delayed magnitude correlation signal 166 is input to summing device 168. The set of four magnitude correlation signals 108, 168, 162, and 166 are summed by summing circuit 168 to form a combined magnitude correlation signal 112 (CMCS) (i.e., output 112). The output 112 will have a non-zero value which is input to peak detection mechanism 114. It will be appreciated by those skilled in the art that the principles described in reference to four synchronization words in a synchronization sequence can readily extended to more or less synchronization words without departing from the scope and spirit of the present invention.

Figure 5:
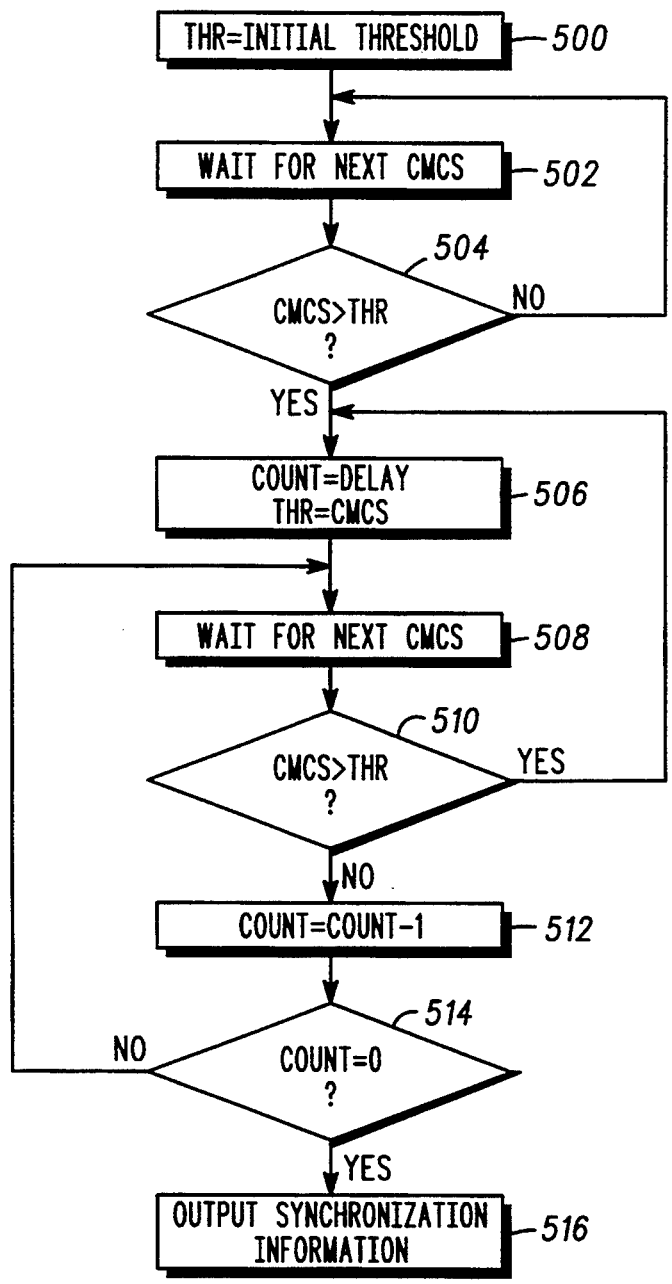
FIG. 5 shows flowchart of how a combined magnitude correlation signal is compared to a predetermined magnitude threshold in accordance with a preferred embodiment of the present invention.

In addition, in this preferred alternative embodiment, the peak detection mechanism 114 determines if the known predetermined synchronization sequence is present in the combined magnitude correlation signal 112 according to an algorithm detailed by the flowchart shown in FIG. 5. A predetermined magnitude threshold is set 500 to an initial threshold. The peak detection mechanism 114 then waits 502 for a combined magnitude correlation signal 112 to be input.

When a combined magnitude correlation signal 112 is input, it is compared 504 to the predetermined magnitude threshold. If the combined magnitude correlation signal 112 is not greater than the predetermined magnitude threshold, then the peak detection mechanism 114 will return to flowchart element 502 and continue steps according to the flowchart in FIG. 5. Otherwise, when the combined magnitude correlation signal 112 is greater than the predetermined magnitude threshold, the predetermined threshold is set 506 to equal the combined magnitude correlation signal 112.

In addition, a count value is set 506 equal to a predetermined time delay. The count value is used to delay notification of the detection of the synchronization sequence for a short time period. This short time period delay allows the peak detection mechanism to verify that the synchronization sequence was actually detected, rather than a false signal being detected. This delay function is preferably implemented as follows after flowchart element 506. The peak detection mechanism 114 waits 508 for another combined magnitude correlation signal 112 to be input. When another combined magnitude correlation signal 112 is input, it is compared 510 to the predetermined magnitude threshold. If the combined magnitude correlation signal 112 is greater than the predetermined magnitude threshold, then the peak detection mechanism 114 returns to flowchart element 506 and continues steps according to the flowchart in FIG. 5. Otherwise, when the combined magnitude correlation signal 112 is not greater than the predetermined magnitude threshold, the count value is decremented 512. If the count value is not zero or null, then the peak detection mechanism 114 returns to flowchart element 508 and continues steps according to the flowchart in FIG. 5. Otherwise, if the count value is zero or null, then the peak detection mechanism 114 notifies 516 the decision logic 152 of the synchronization sequence detection through an output signal 116 such that synchronization information may be subsequently output by the alternative preferred embodiment synchronization information generator. In addition, the peak detection mechanism 114 sends a peak combined magnitude correlation signal 132 to the FIFO buffer 120 so that the peak combined magnitude correlation signal output 132 can be saved along with the input data sequence 100 at the location of where the peak combined magnitude correlation signal 132 occurred in the input data sequence 100.

Figure 3:
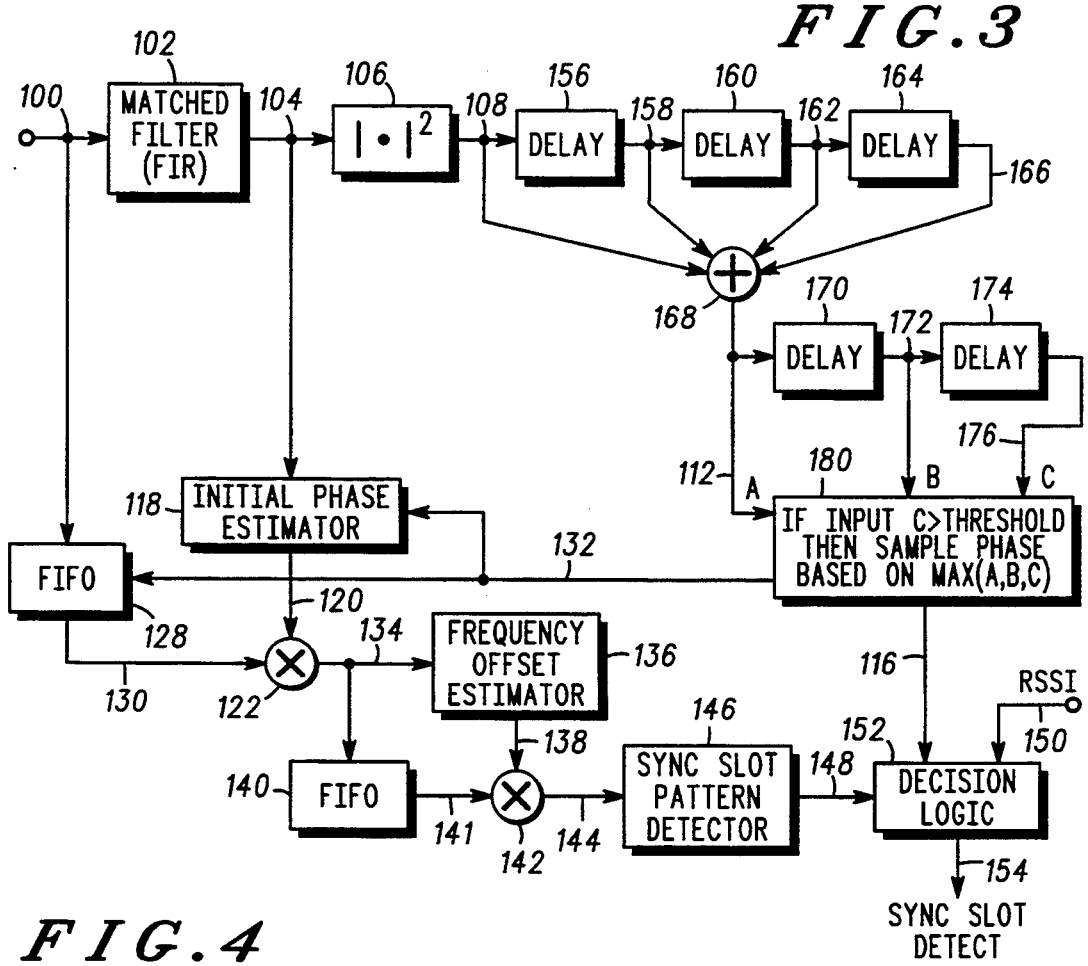
FIG. 3 is a diagram showing a second alterative preferred embodiment synchronization information generator in accordance with the present invention.

Referring now to FIG. 3, an alternative preferred embodiment synchronization information generator is shown. The alterative preferred embodiment synchronization information generator is configured and operated substantially as described in reference to the preferred embodiment synchronization information generator shown in FIG. 1. In this alternative embodiment, the M-tap FIR filter 110 has been replaced by elements 156, 160, 164 and 168 which are configured and operated substantially as described in reference to the alternative preferred embodiment synchronization information generator shown in FIG. 2.

In addition, in this preferred alternative embodiment, the peak detection mechanism 114 has been replaced by elements 170, 174 and 180 which input and output substantially the same information as previously described in reference to the peak detection mechanism 114. The combined magnitude correlation signal 112 is input to a comparison device 180. The combined magnitude correlation signal 112 is also input to delay mechanism 170 which delays the combined magnitude sequence for the length of one synchronization word. The one synchronization word delayed combined magnitude correlation signal 172 is input to comparison device 180. The one synchronization word delayed combined magnitude correlation signal 172 is also input to delay mechanism 174 which delays the combined magnitude correlation signal 172 by the length of another synchronization word. The two synchronization word delayed combined magnitude correlation signal 176 is input to comparison device 188. It will be appreciated by those skilled in the art that the delay mechanism 170 and 174 may delay the combined magnitude sequence by substantially more or less than one synchronization word without departing from the scope and spirit of the present invention.

Subsequently, the two synchronization word delayed combined magnitude correlation signal 176 is compared by comparison device 180 to a predetermined magnitude threshold. This comparison is continued by comparison device 180 until the compared two synchronization word delayed combined magnitude correlation signal is greater than the predetermined threshold. If the two synchronization word delayed combined magnitude correlation signal 176 is greater than the predetermined magnitude threshold, then the synchronization information based on a maximum combined magnitude correlation signal is prepared, by comparison device 180, for output after a synchronization pattern is detected. This maximum combined magnitude correlation signal is selected from among the combined magnitude correlation signal 112 and two formed delayed combined magnitude correlation signals 172 and 176. In addition, the comparison device 180 notifies the decision logic 152 of the synchronization sequence detection through an output signal 116 such that prepared synchronization information may be subsequently output by the alternative preferred embodiment synchronization information generator. Finally, the comparison device 180 sends the maximum combined magnitude correlation signal 132 to the FIFO buffer 128 so that the maximum combined magnitude correlation signal output 132 can be saved along with the input data sequence 100 at the location of where the maximum combined magnitude correlation signal 132 occurred in the input data sequence 100.

Figure 4:
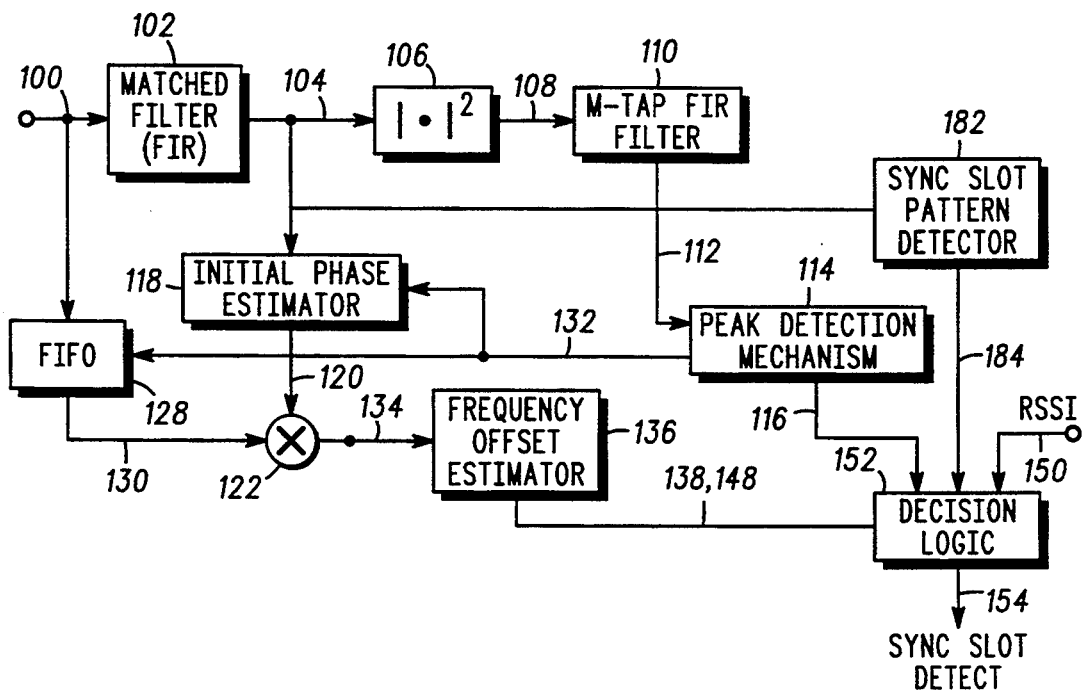
FIG. 4 is a diagram showing a third alternative preferred embodiment synchronization information generator in accordance with the present invention.

Referring now to FIG. 4, an alternative preferred embodiment synchronization information generator is shown. The alterative preferred embodiment synchronization information generator is configured and operated substantially as described in reference to the preferred embodiment synchronization information generator shown in FIG. 1. In this alternative embodiment, the complex frequency correction value 138 generated by frequency offset estimator 136 may be directly coupled via signal 148 to the decision logic 152. This complex frequency correction value 138 may be used by decision logic 152 in deriving a confidence decision 154. In addition, for this alternative preferred embodiment, the known predetermined synchronization sequence preferably consists of differentially encoded synchronization words. As such a differentially encoded pattern detector 182 may be coupled to the output 104 of matched filter 102. The differentially encoded pattern detector 182 sends a message, via a signal 184, to the decision logic 152 when the differentially encoded synchronization pattern is detected. This message signal 184 may be used by decision logic 152 in deriving a confidence decision 154.

Figure 6:
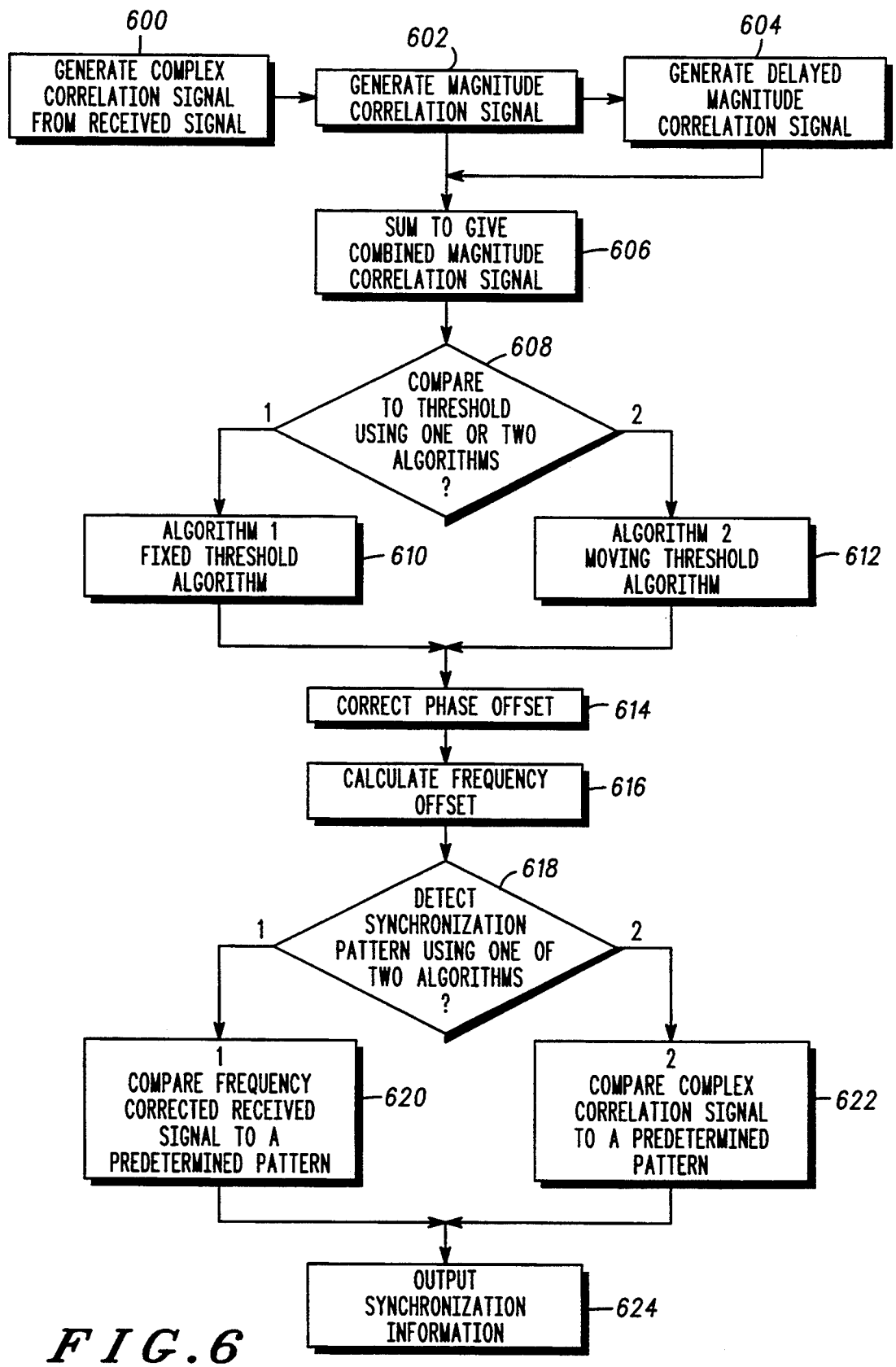
FIG. 6 shows flowchart of how synchronization information is generated in accordance with a preferred embodiment of the present invention.

Alternatively, the preferred embodiment received communication signal synchronizing technique shown in FIG. 1 through FIG. 5 can be described as follows with reference to FIG. 6. A method for synchronizing a received communication signal is provided. Initially, a received signal having a plurality of synchronization words is correlated 600 to generate a complex correlation signal. Each synchronization word has a predetermined number of synchronization symbols. A magnitude correlation signal is generated 602 from the complex correlation signal. The magnitude correlation signal is delayed 604 to form at least one delayed magnitude correlation signal for each received synchronization word. This magnitude correlation signal is delayed 604 in increments of a synchronization word length. Subsequently, the magnitude correlation signal and the delayed magnitude correlation signals are summed together 606 to generate a combined magnitude correlation signal. This combined magnitude correlation signal is preferably compared to a predetermined magnitude threshold according to one of two different algorithms. It will be appreciated by those skilled in the art that other similar algorithms may be readily substituted in place of these comparison algorithms without departing from the scope and spirit of the present invention.

The first comparison algorithm 610 consists of delaying the combined magnitude correlation signal to form at least one delayed combined magnitude correlation signal. The combined magnitude correlation signal is then delayed in increments of a synchronization word length. Subsequently, the delayed combined magnitude correlation signal having the longest delay from among the formed delayed combined magnitude correlation signals is compared to a predetermined magnitude threshold. This comparison is continued until the compared delayed combined magnitude correlation signal is greater than the predetermined threshold. At which point the synchronization information based on a maximum combined magnitude correlation signal is prepared for output after a synchronization pattern is detected. This maximum combined magnitude correlation signal is selected from among the combined magnitude correlation signal and the formed delayed combined magnitude correlation signals.

The second comparison algorithm 612 consists of comparing the combined magnitude correlation signal to a predetermined initial magnitude threshold until the combined magnitude correlation signal is greater than the predetermined initial magnitude threshold. At which point the predetermined initial magnitude threshold is changed to equal the combined magnitude correlation signal. This comparison and magnitude threshold change is continued subsequently until the magnitude threshold has not been changed for a predetermined period of time. Subsequently, synchronization information based on the combined magnitude correlation signal corresponding to the current magnitude threshold is prepared for output after a synchronization pattern is detected.

After either comparison algorithm is completed, a phase offset for the received signal is determined and corrected based on the output synchronization information. In addition, a frequency offset of the phase corrected received signal is determined 616. Subsequently, if a synchronization pattern is employed, then it is preferrably detected 618 according to one of two different detecting algorithms. It will be appreciated by those skilled in the art that other similar algorithms may be readily substituted in place of these detecting algorithms without departing from the scope and spirit of the present invention. The first detecting algorithm 620 consists of correcting the frequency offset of the phase corrected received signal and generating first pattern confidence information by comparing the frequency corrected received signal to a predetermined pattern. The second detecting algorithm 622 consists of generating second pattern confidence information by comparing the complex correlation signal to a predetermined pattern.

After either detecting algorithm is completed, the prepared synchronization information is output 624 based on a confidence decision derived from at least one decision factor. The decision factors may include a received signal strength indicator, the synchronization information, the first pattern confidence information, the second pattern confidence information, and the frequency offset of the received signal.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed.

What is claimed is:
1. A method for synchronizing a received communication signal, comprising:

(a) generating a synchronization signal derived from a received signal having a synchronization sequence comprising a plurality of synchronization words, each synchronization word having a predetermined number of synchronization symbols;

(b) filtering the synchronization signal, the filtering being characterized by spacing each filter tap to correspond to synchronization word length increments;

(c) generating synchronization information based on a comparison of the filtered synchronization signal to a threshold; and (d) outputting the synchronization information based on a confidence decision derived from the synchronization information.

2. The method of claim 1 wherein the step of generating the synchronization signal comprises correlating the received signal to generate a complex correlation signal and generating a magnitude correlation signal from the complex correlation signal.

3. The method of claim 2 wherein the step of filtering the synchronization signal comprises delaying the magnitude correlation signal to form at least one delayed magnitude correlation signal for each received synchronization word, the magnitude correlation signal being delayed in increments of a synchronization word length and subsequently summing the magnitude correlation signal and the delayed magnitude correlation signals to generate a combined magnitude correlation signal.

4. The method of claim 3 wherein the step of generating synchronization information comprises:

(a) delaying the combined magnitude correlation signal to form at least one delayed combined magnitude correlation signal, the combined magnitude correlation signal being delayed in increments of a synchronization word length;

(b) comparing a delayed combined magnitude correlation signal having the longest delay from among the formed delayed combined magnitude correlation signals to a predetermined magnitude threshold; and (c) preparing synchronization information for output based on a maximum combined magnitude correlation signal from among the combined magnitude correlation signal and the formed delayed combined magnitude correlation signals, when the compared delayed combined magnitude correlation signal is greater than the predetermined magnitude threshold.

5. The method of claim 3 wherein the step of generating synchronization information comprises:

(a) comparing the combined magnitude correlation signal to a predetermined initial magnitude threshold until the combined magnitude correlation signal is greater than the predetermined initial magnitude threshold and then changing the predetermined initial magnitude threshold to equal the combined magnitude correlation signal;

(b) continuing subsequently to change the magnitude threshold to equal the combined magnitude correlation signal when the combined magnitude correlation signal is greater than the magnitude threshold until the magnitude threshold is unchanged for a predetermined period of time; and (c) preparing subsequently synchronization information for output based on the combined magnitude correlation signal corresponding to the current magnitude threshold.

6. The method of claim 1 wherein the step of outputting synchronization information comprises:

(a) determining and correcting a phase offset for the received signal based on the synchronization information;

(b) determining frequency offset of the phase corrected received signal; and (c) outputting synchronization information based on a confidence decision derived from the frequency offset of the received signal.

7. The method of claim 1 wherein the step of outputting synchronization information comprises:

(a) determining and correcting a phase offset for the received signal based on the synchronization information;

(b) determining and correcting a frequency offset of the phase corrected received signal;

(c) generating pattern confidence information by comparing the frequency corrected received signal to a predetermined synchronization pattern; and (d) outputting synchronization information based on a confidence decision derived from the pattern confidence information.

8. The method of claim 2 wherein the step of outputting synchronization information comprises:

(a) generating pattern confidence information by comparing the complex correlation signal to a predetermined synchronization pattern; and (b) outputting synchronization information based on a confidence decision derived from the pattern confidence information.

9. The method of claim 1 wherein the step of outputting synchronization information comprises outputting synchronization information based on a confidence derision derived from a received signal strength indicator.

10. A method for synchronizing a received communication signal, comprising:

(a) correlating a received signal having a synchronization sequence comprising a plurality of synchronization words to generate a complex correlation signal, each synchronization word having a predetermined number of synchronization symbols;

(b) generating a magnitude correlation signal from the complex correlation signal;

(c) delaying the magnitude correlation signal to form at least one delayed magnitude correlation signal for each received synchronization word, the magnitude correlation signal being delayed in increments of a synchronization word length;

(d) summing the magnitude correlation signal and the delayed magnitude correlation signals to generate a combined magnitude correlation signal;

(e) comparing the combined magnitude correlation signal to a predetermined magnitude threshold according to an algorithm selected from the group consisting of:

(i) delaying the combined magnitude correlation signal to form at least one delayed combined magnitude correlation signal, the combined magnitude correlation signal being delayed in increments of a synchronization word length, comparing a delayed combined magnitude correlation signal having the longest delay from among the formed delayed combined magnitude correlation signals to the predetermined magnitude threshold, when the compared delayed combined magnitude correlation signal is greater than the predetermined threshold, preparing synchronization information for output based on a maximum combined magnitude correlation signal from among the combined magnitude correlation signal and the formed delayed combined magnitude correlation signals; and (ii) comparing the combined magnitude correlation signal to a predetermined initial magnitude threshold until the combined magnitude correlation signal is greater than the predetermined initial magnitude threshold and then changing the predetermined initial magnitude threshold to equal the combined magnitude correlation signal, continuing subsequently to change the magnitude threshold to equal the combined magnitude correlation signal when the combined magnitude correlation signal is greater than the magnitude threshold until the magnitude threshold is unchanged for a predetermined period of time, preparing subsequently synchronization information for output based on the combined magnitude correlation signal corresponding to the current magnitude threshold;

(f) determining and correcting a phase offset for the received signal based on the output synchronization information;

(g) determining frequency offset of the phase corrected received signal;

(h) detecting a synchronization pattern according to a detecting algorithm selected from the group consisting of:

(i) correcting the frequency offset of the phase corrected received signal, generating first pattern confidence information by comparing the frequency corrected received signal to a predetermined pattern; and (ii) generating second pattern confidence information by comparing the complex correlation signal to a predetermined pattern; and outputting the prepared synchronization information based on a confidence decision derived from at least one decision factor selected from the group consisting of a received signal strength indicator, the synchronization information, the first pattern confidence information, the second pattern confidence information, and the frequency offset of the received signal.

11. A digital radio communication unit having signal synchronizing capability, comprising:

(a) synchronization signal generator means for generating a synchronization signal derived from a received signal having a synchronization sequence comprising a plurality of synchronization words, each synchronization word having a predetermined number of synchronization symbols;

(b) filter means, operatively coupled to the synchronization signal means, for filtering the synchronization signal, the filtering being characterized by spacing each filter tap to correspond to synchronization word length increments;

(c) synchronization information generator means, operatively coupled to the filter means, for generating synchronization information based on a comparison of the filtered synchronization signal to a threshold; and (d) synchronization information output means, operatively coupled to the synchronization information generator means, for outputting synchronization information based on a confidence decision derived from the synchronization information.

12. The digital radio communication unit of claim 11 wherein the synchronization signal generator means comprises correlation means for correlating the received signal to generate a complex correlation signal and for generating a magnitude correlation signal from the complex correlation signal.

13. The digital radio communication unit of claim 12 wherein the filter means comprises means for delaying the magnitude correlation signal to form at least one delayed magnitude correlation signal for each received synchronization word, the magnitude correlation signal being delayed in increments of a synchronization word length and means for subsequently summing the magnitude correlation signal and the delayed magnitude correlation signals to generate a combined magnitude correlation signal.

14. The digital radio communication unit of claim 13 wherein the synchronization information generator means comprises:

(a) delay means for delaying the combined magnitude correlation signal to form at least one delayed combined magnitude correlation signal, the combined magnitude correlation signal being delayed in increments of a synchronization word length;

(b) comparison means, operatively coupled to the delay means, for comparing a delayed combined magnitude correlation signal having the longest delay from among the formed delayed combined magnitude correlation signals to a predetermined magnitude threshold; and (c) synchronization information output means, operatively coupled of the comparison means, for outputting synchronization information based on a maximum combined magnitude correlation signal from among the combined magnitude correlation signal and the formed delayed combined magnitude correlation signals, when the compared delayed combined magnitude correlation signal is greater than the predetermined magnitude threshold.

15. The digital radio communication unit of claim 13 wherein the synchronization information generator means comprises:

(a) comparison means for comparing the combined magnitude correlation signal to a predetermined initial magnitude threshold until the combined magnitude correlation signal is greater than the predetermined initial magnitude threshold and then changing the predetermined initial magnitude threshold to equal the combined magnitude correlation signal;

(b) changing means, operatively coupled to the comparison means, for continuing subsequently to change the magnitude threshold to equal the combined magnitude correlation signal when the combined magnitude correlation signal is greater than the magnitude threshold until the magnitude threshold is unchanged for a predetermined period of time; and (c) synchronization information output means, operatively coupled to the changing means for outputting subsequently synchronization information based on the combined magnitude correlation signal corresponding to the current magnitude threshold.

16. The digital radio communication unit of claim 11 wherein the synchronization information output means comprises:
   (a) phase offset means for determining and correcting a phase offset for the received signal based on the synchronization information;
   (b) frequency offset means, operatively coupled to the phase offset means, for determining frequency offset of the phase corrected received signal; and
   (c) a synchronization information output, operatively coupled to the frequency offset means, which outputs synchronization information based on a confidence decision derived from the frequency offset of the received signal.

17. The digital radio communication unit of claim 11 wherein the synchronization information output means comprises:
   (a) phase offset means for determining and correcting a phase offset for the received signal based on the synchronization information;
   (b) frequency offset means, operatively coupled to the phase offset means, for determining and correcting a frequency offset of the phase corrected received signal;
   (c) pattern confidence information generator means, operatively coupled to the frequency offset means, for generating pattern confidence information by comparing the frequency corrected received signal to a predetermined synchronization pattern; and
   (d) a synchronization information output, operatively coupled to the pattern confidence information generator means, which outputs synchronization information based on a confidence decision derived from the pattern confidence information.

18. The digital radio communication unit of claim 11 wherein the synchronization information output means comprises:
   (a) pattern confidence information generator means for generating pattern confidence information by comparing the complex correlation signal to a predetermined synchronization pattern; and
   (b) a synchronization information output, operatively coupled to the pattern confidence information generator means, which outputs synchronization information based on a confidence decision derived from the pattern confidence information.

19. The digital radio communication unit of claim 11 wherein the synchronization information output means comprises a synchronization information output which outputs synchronization information based on a confidence decision derived from a received signal strength indicator.

* * * * *